United States Patent [19]
Andrews

[11] Patent Number: 6,062,318
[45] Date of Patent: May 16, 2000

[54] MULTI-PURPOSE HORTICULTURAL APPARATUS

[76] Inventor: David C. Andrews, 3721 Sulton Ct., Tallahassee, Fla. 32312

[21] Appl. No.: 08/937,927

[22] Filed: Sep. 27, 1997

[51] Int. Cl.[7] .................................................. A01B 45/00
[52] U.S. Cl. ............................ 172/15; 30/347; 30/DIG. 5
[58] Field of Search .................... 172/15, 13; 30/DIG. 5, 30/DIG. 7, 347, 353

[56]     References Cited

U.S. PATENT DOCUMENTS

| | | | |
|---|---|---|---|
| 2,745,331 | 5/1956 | Lancour | 172/15 |
| 3,057,411 | 10/1962 | Carlton | 172/15 |
| 3,923,102 | 12/1975 | Morris | 172/13 |
| 4,002,205 | 1/1977 | Falk | 172/15 |
| 4,072,195 | 2/1978 | Carlson | 172/15 |
| 4,653,590 | 3/1987 | Shank | 172/15 |
| 5,355,597 | 10/1994 | Pollard | 172/15 X |
| 5,441,115 | 8/1995 | Horzepa | 172/15 |
| 5,490,371 | 2/1996 | Potucek | 56/17.2 |
| 5,592,992 | 1/1997 | Thompson | 172/15 |

*Primary Examiner*—Christopher J. Novosao
*Attorney, Agent, or Firm*—Carnes Cona & Dixon

[57]     ABSTRACT

The present invention is a blade which is designed and configured to be utilized with conventional edging devices. The blade of the present invention is substantially U-shaped and includes a top planar wall having opposite ends. Extending outward from each end is a rectangular shaped end portion. When in use, the outer walls of the end portions will contact the ground. This will offer the user a device which is versatile and powerful. For protecting the user, a cover is provided.

19 Claims, 4 Drawing Sheets

MULTI-PURPOSE HORTICULTURAL APPARATUS

BACKGROUND OF THE INVENTION

1. Field of the Invention

The present invention relates generally to a horticultural apparatus and more particularly to a versatile apparatus which is designed and configured to perform a multiplicity of gardening tasks, such as edging, tilling, digging a trench, and the like, while utilizing a singular unit, quickly, easily, and efficiently.

2. Description of the Prior Art

Throughout the United States, more and more homeowners are maintaining their own lawns and gardens. To many, this is more of a hobby than a chore, and, at times, is a way of getting exercise and/or relieving stress while still providing a source of enjoyment. One of the many tasks involved with gardening is mowing the lawn, forming flower beds, and weeding the beds on a regular basis. For areas where the mower cannot reach, the gardener depends on a conventional edger or the like.

Edgers are well known in the art and are widely utilized by the homeowner and landscape personnel. Several types and styles exist which allow for proper trimming between a lawn and the adjacent walks, around garden beds, landscape lighting, or the like. In this configuration, the user, after edging, must gather, such as by raking, and remove the excess debris. This process is a time consuming and laborious task.

An edger device is disclosed in U.S. Pat. No. 5,490,371 issued to Potucek, III. In this patent there is disclosed a conventional edger having a debris guard attached to an edger head. This edger head includes a flat metal blade or optionally a flexible line. The debris guard comprises two flaps fabricated from flexible material and having an overall rectangular shape. In this device, the user attaches the guard to a conventional edger for protecting the operator and/or bystanders from debris, which may propel from the blade. Though successful with flat metal blades, this device is limited in utility by providing a guard shaped, designed and configured which cannot be used with blades having U-shaped structures or the like. Additionally, the conventional edger, as disclosed, are also limited in use, by providing a blade which cannot be used for other tasks, such as tilling or having the capability of digging a trench. Thereby, disclosing a single application device which still requires the user to hoe out remaining debris, inherently providing a device which does not reduce the time necessary for properly performing the task of edging.

Another edging device is disclosed in U.S. Pat. No. 3,923,102 issued to Morris. In this patent there is disclosed a tool, having a U-shape blade, to provide for the opened end of the U-shape to encompass a sprinkle head for trimming. In this patent, the U-shaped blade includes a transverse section and end sections perpendicular to the transverse section. A segment of each end section is bent inward to provide for an inward trailing edge and an inward leading edge. As with conventional lawnmowers, this leading edge of the edger is used for cutting while the trailing edge forms an air vane so as to create an upward movement of air as the U-shape blade rotates, inherently lifting the grass and other debris upward. In operation, as the blade rotates, the leading or sharpened edge cuts the grass while the upward movement of air created by the trailing edges ejects the grass cuttings from beneath the disclosed edger. A flaw with this design is that during rotation, each end section is constantly bombarded with particles of sand, dirt, wood, pebbles, and other debris. This will eventually dull the cutting edge as well as cut away from the blade, consequently, destroying the blade's ability to cut as well as failing to create sufficient air movement to eject the grass cuttings. The result is an accumulation of grass cuttings around the blade which can cause the edger to stall. Instead of easing the process of edging, this device can add to the time and energy needed to properly trim.

Accordingly, it is seen that none of these previous efforts provide the benefits intended with the present invention, such as providing a multi-purpose horticultural apparatus with the capability of performing several gardening tasks quickly and efficiently. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a multi-purpose horticultural apparatus designed and configured to successfully accomplish a plurality of processes typically performed in a yard, garden, or the like, while substantially reducing the time and energy needed to perform the various gardening tasks.

The horticultural apparatus of the present invention comprises a conventional portable edger body, known in the art, and the conventional edger head. Secured to the lower area of the head is a unique substantially U-shape blade. The U-shape structure includes a planar top portion and two outer planar end portions. The outer end portions are oppositely located and extend substantially outward and perpendicularly from the top portion. This will provide for the outer planar portions to be parallel to the ground when in use. Optionally, the two outer planar end portions can be disposed at a slight tilt or non-perpendicularly, with respect to the top portion, to provide for the outer planar end portions to extend outwardly and towards each other.

The top portion and the two end portions are substantially rectangular in shape. The rectangular shape of the end portion is constructed to dig into the ground. Increasing or decreasing the length and width of the rectangular shape end portions will intrinsically result in altering the coverage of the blade. A wider and longer end portion will inherently produce a wider edge. Optionally, increasing the size can result in utilizing the device for tilling a garden. The width of a trench, when using the device for excavating soil, is determined by the length of the end portion.

The top portion of the blade can extend pass the two outer planar portions. This structure will provide for a first flange to extend from a first side of the top portion and a second flange to extend from a second side of the top portion. These flanges or extensions will act as a guide and will allow the multi-purpose horticultural apparatus to operate linearly.

The unique structure of the blade eliminates the prior means of leading and trailing edges, typically associated with conventional cutting devices, such as lawn mowers. Instead, this structure provides a blade which is more durable and will offer a means of adequately performing a multiplicity of task, including disintegrating the grass. The structure of the blade will also produce a device which is long lasting and which is self-sharpening. This is because the abrasive particles moving between the outer ends are traveling in a straight line rather than having to change direction as when they move around conventional leading and trailing surfaces. Thus, the particles are exerting less force of inertia against the outer ends. The cutting action does occur on the flat surfaces of the rectangular shaped outer ends and is more evenly distributed, resulting in much less damage.

The horticultural apparatus of the present invention also includes a blade guard which is used to protect the user from debris or the like. This blade guard extends pass the outer portions for providing proper coverage for the user. This blade guard is designed for blocking debris which may propel from the blade. Additionally, the blade guide provides an adequate amount of clearance between the blade and itself, so as to prevent build-up, typically associated with conventional edgers.

Accordingly, it is the object of the present to provide for a multi-purpose horticultural apparatus which will overcome the deficiencies, shortcomings, and drawbacks of prior horticultural apparatus, such as conventional edgers, and methods thereof.

Yet another object of the present invention is to provide for a multi-purpose horticultural apparatus which will enable the user to trim grass, cultivate soil, or excavate trenches with a singular unit.

Another object of the present invention is to provide for a multi-purpose horticultural apparatus which includes a unique blade design for providing the cut grass to be disintegrated for use as mulch, hence eliminating the need for raking for its removal.

Still another object of the present invention is to provide for a multi-purpose horticultural apparatus wherein a guard is provided for protecting the user from flying debris and prevent clogs to occur with the blade, thus, increasing the life of the blade.

Yet another object of the present invention is to provide for a unique structure for a blade and guard which can easily be retrofitted onto an existing edger for providing for a multi-purpose horticultural apparatus.

Still a further object of the present invention, to be specifically enumerated herein, is to provide a multi-purpose horticultural apparatus in accordance with the preceding objects and which will conform to conventional forms of manufacture, be of simple construction and easy to use so as to provide a device that would be economically feasible, long lasting and relatively trouble free in operation.

Although there have been many inventions related to horticultural apparatus, such as conventional edgers, none of the inventions provide a singular unit capable of successfully performing a multiplicity of gardening task, such as tilling, excavating, or the like. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
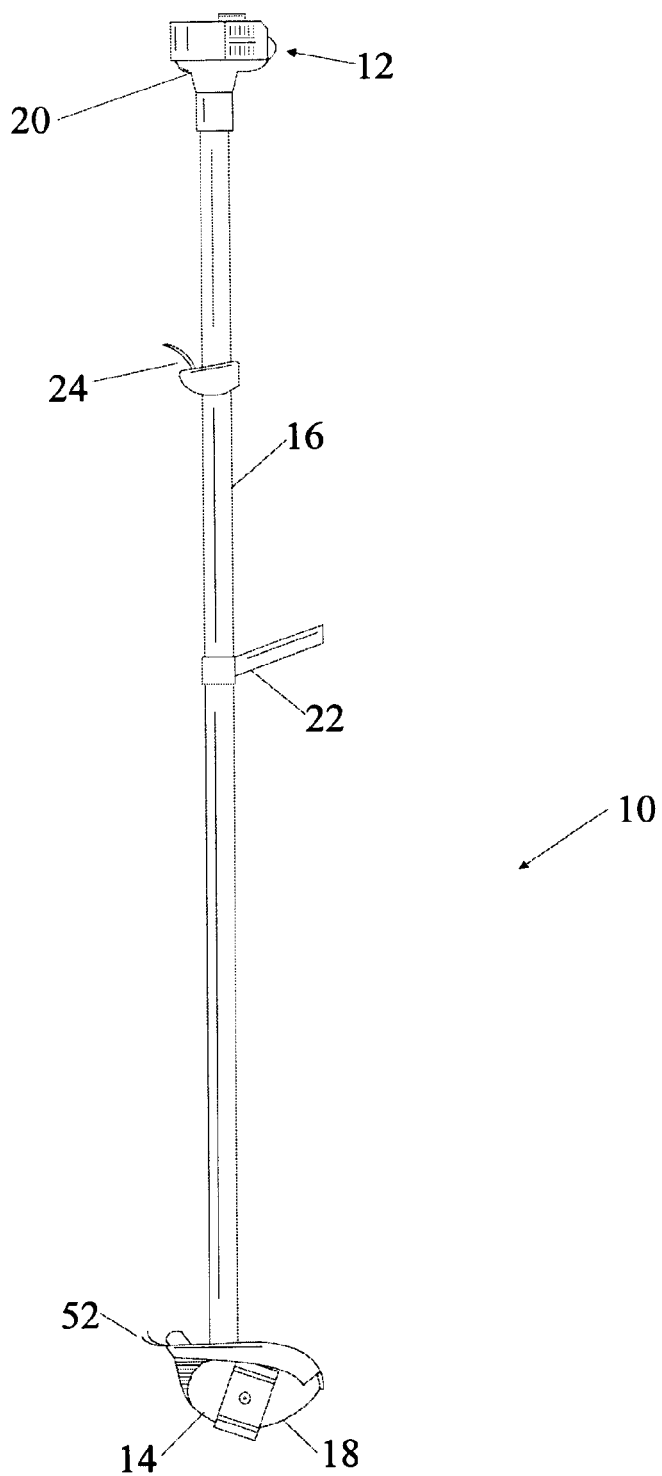
FIG. 1 is a perspective view of the horticultural apparatus of the present invention.

With reference to drawings, and in particular to FIGS. 1, 2, 3 and 4 thereof, the multi-purpose horticultural apparatus of the present invention will be described. As seen, the multi-purpose horticultural apparatus 10 of the present invention comprises an upper control unit 12 coupled to a lower head portion 14. The overall configuration of the upper control unit 12 of the portable edger is conventional and well known.

Briefly, the lower head portion 14 is powered by the upper control unit 12. A shaft 16 couples the head portion 14 to the upper control unit 12. Power is transferred from the control unit to a blade 18 via wiring. The wiring is encased within the shaft.

The user operates and handles the device by placing their hands on a grip 20, located in proximity to the upper control unit, and an additional handle 22. A throttle switch 24, situated in proximity to the grip, activates and deactivates the unit.

The lower head portion 14 includes the blade 18 which is designed and configured to performed a multiplicity of functions due to its unique structure. During utilization, this blade 18 will rotate vertically. As seen in FIGS. 1–4, the blade 18 has a substantially U-shape configuration and includes an upper planar portion 26 having a first end 26a and a second end 26b. Extending downwardly and in proximity to the first end 26a of the upper portion 26 is a first end portion 28a. Extending downwardly and in proximity to the second end 26b of the upper portion 26 is a second end portion 28b.

As seen in the drawings, the upper portion 26 and end portions 28a and 28b are substantially rectangular in shape. The upper portion 26 will rotate vertically with respect to the ground. This will provide for the end portions, 28a and 28b, to contact and engage the ground and soil. Due to the rectangular shape of the end portions 28a and 28b, an outer edge 30a of the first end portion and the inner edge 30b of the second end portion will strike the ground or soil. The outer edge 30a and inner edge 30b act as elongated blades to increase size, area of coverage, and cutting capabilities of the blade 18.

Since the blade 18 will rotate vertically, the inner and outer edges will be in direct contact with debris and the like. Due to this means of operation and contact, the first end portion 28a and the second end portion 28b will function as self sharpening cutting edges. This self sharpening characteristic produces a durable and long lasting blade.

The self sharpening occurs because the abrasive particles, dirt, grass blades, and the like, move in a straight line between the first and second end portions, 28a and 28b, respectively. This straight line flight exerts less force against the end portions and provides for a more event distribution of impact on the flat surface, resulting in little damage to the blade 14.

As seen in the figures, a gap is formed between the first end portion and a second end portion. There is no obstruction located therebetween to provide for the overall shape of the blade to be generally U-shape.

Figure 2:
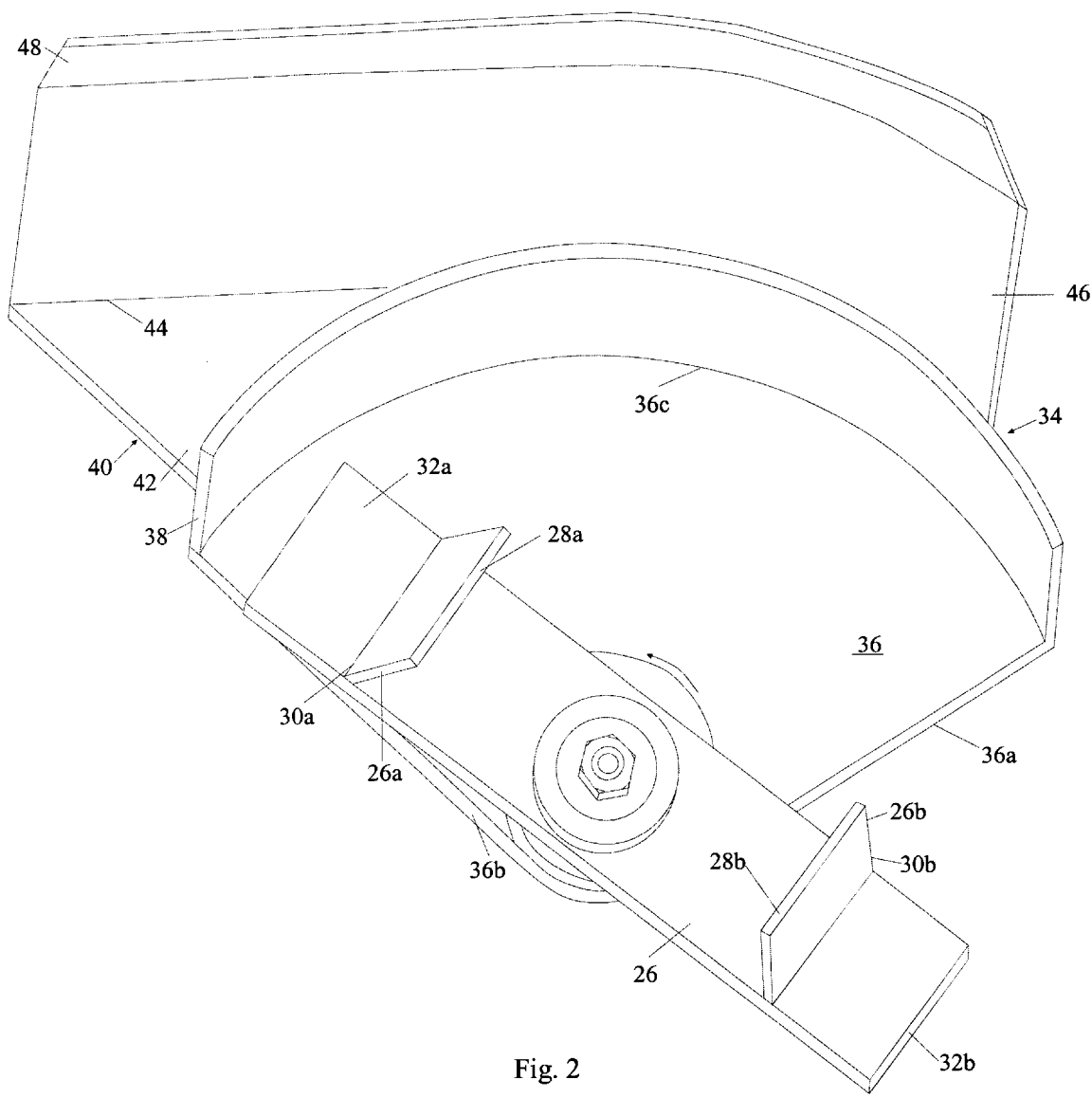
FIG. 2 is a bottom view of the head portion of the horticultural apparatus of the present invention.
Figure 3:
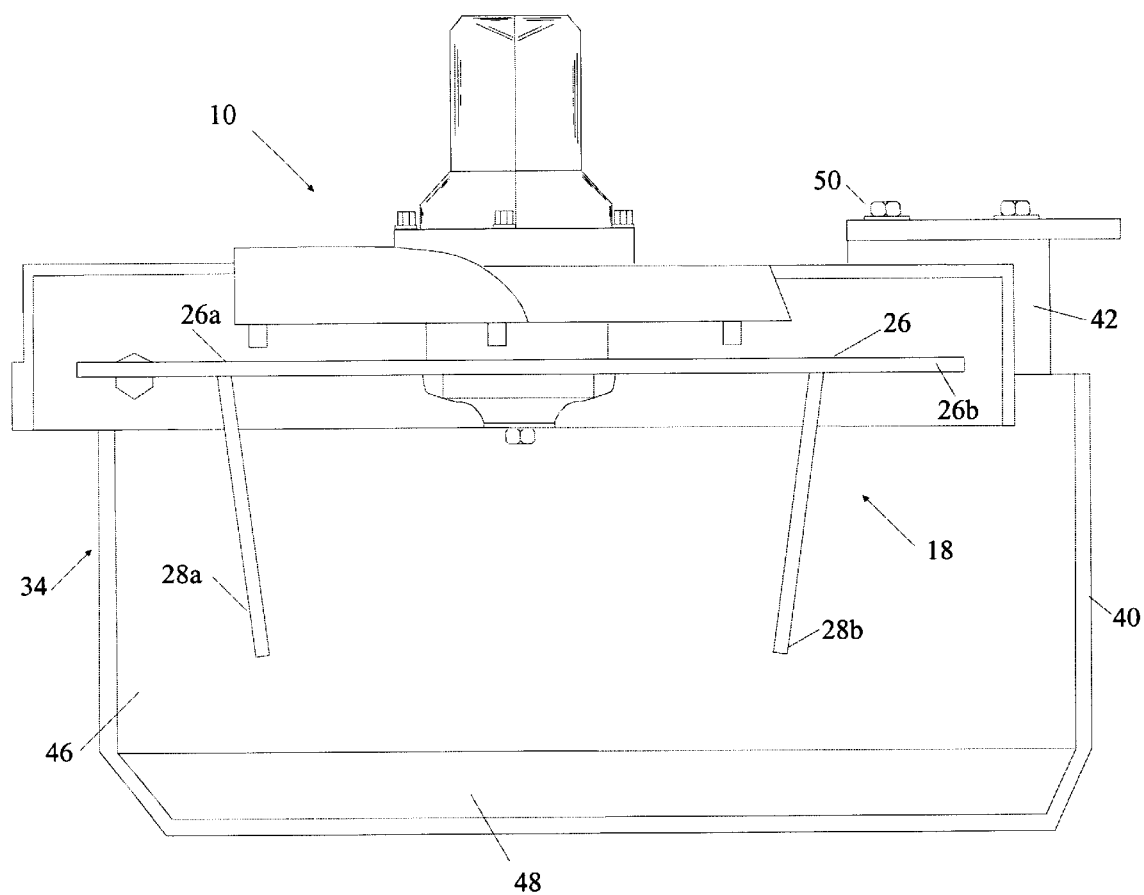
FIG. 3 is a front side view of the head portion of the horticultural apparatus of the present invention.
Figure 5:
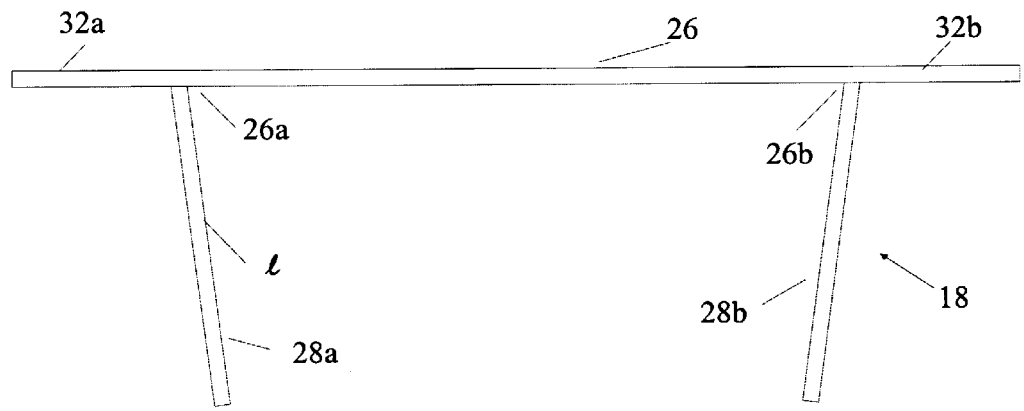
FIG. 5 is side view of a variant for the U-shaped blade used in the horticultural apparatus of the present invention.

As seen in FIGS. 2, 3, and 5, the upper planar portion 26 can extend beyond the first end 26a and second end 26b. This extension will provide for the upper planar member to have a first flange 32a and a second flange 32b. These flange act as a guide means for the multi-purpose horticultural device of the present invention. The guide means will allow the operator to travel linearly while operating the device. In operation, as the upper planar portion 26 rotates vertically, the first flange 32a and second flange 32b will graze the surface prior to the first end portion 28a and second end portion 28b. This prior contact will inherently keep the device in line and offer more control for the operator.

Figure 4:
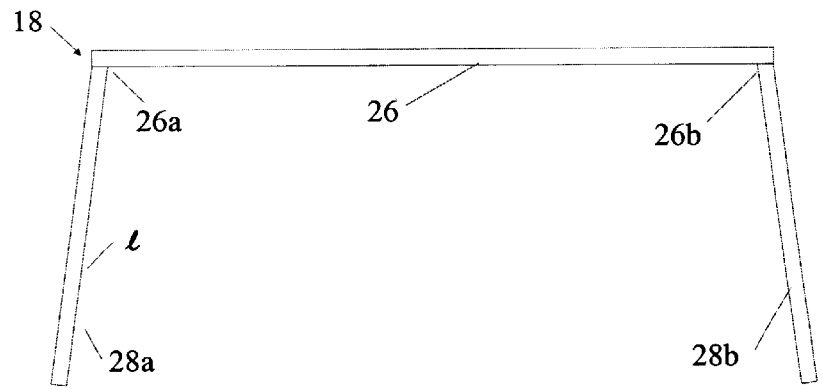
FIG. 4 is a perspective view of the horticultural apparatus of the present invention, illustrating a guide means secured to the blade.

The placement of the end portion 28a and 28b with respect to the upper portion blade can be altered and still produce favorable results. In FIGS. 2–4, the two outer planar end portions 28a and 28b can be disposed at a slight tilt or non-perpendicularly, with respect to the top portion 26, to provide for the outer planar end portions to extend outwardly and towards each other.

Figure 6:
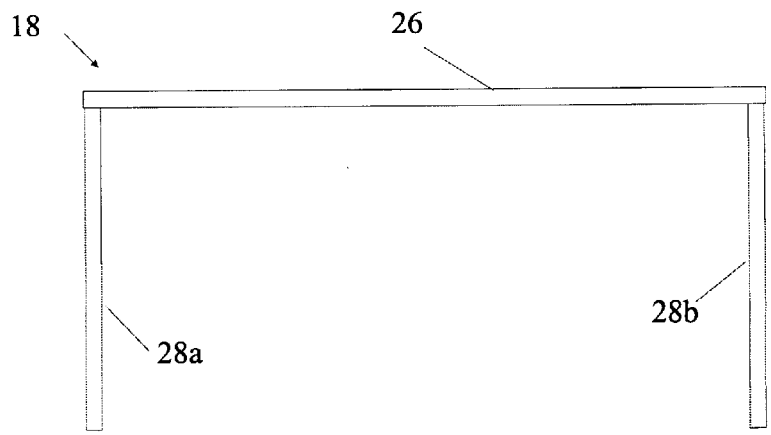
FIG. 6 is a side view of an alliterative configuration for the blade used in the horticultural apparatus of the present invention.

FIGS. 4, 5 and 6 illustrate various variant which can be applied to the blade of the present invention. As illustrated in FIG. 5, the outer end portions 28a and 28b are attached to the upper planar portion 26. The flanges are optional and in this figure, the flanges have been eliminated.

FIG. 5 shows the outer end portion 28a and 28b disposed at a slight tilt or non-perpendicularly, with respect to the top portion, to provide for the outer planar end portions to extend outwardly and away from each other. The flanges, illustrated in FIGS. 2–4 are optionally, and are included in this embodiment for the blade 18.

It is noted that in the embodiments defined above, the outer end portions are illustrated as being angularly attached to the top portion. However, it is noted that the attachment between the outer end portions and top portion can occur at any angular, including being perpendicularly attached thereto. This perpendicular attachment is illustrated in FIG. 6. As seen in this figure, the outer end portions 28a and 28b of blade 18, are attached perpendicularly with respect to the top portion 26.

The length and size of each component of the blade can be altered to produce the desired affect. Hence, it is seen that increasing or decreasing the length and width of the rectangular shape end portions will intrinsically result in altering the coverage of the blade 18. Increasing the length l will provide a blade 18 that is adapted to strike a larger area for providing a device ideally suited for excavating soil for forming a wide trench, tilling and/or weeding a bed. Decreasing the length l will provide a blade 18 that is adapted to strike a smaller area for providing a device ideally suited for excavating soil for cables or the like and/or edging.

The horticultural apparatus 10 of the present invention also includes a blade guard 34 which is used to protect the user from debris or the like. This blade guard 34 is illustrated in further detail in FIGS. 1, 2 and 3. As seen in these figure the blade guard has a substantially triangular cross section to provide for the guard to include a top plate 36. The top plate 36 includes edges 36a, 36b and 36c. The blade is attached in proximity to the point of contact between the first edge 36a and second edge 36b. First edge 36a constitutes the front of the device and second edge 36b constitutes the rear of the device. As shown the rear of the device extends outwardly and away from the blade. This rear allows for a substantial distance to be located between the end of the blade and the third edge 36c of the cover. This additional spacing at the front 38 prevents build-up from the debris.

Extending downwardly from the curved edge 36c, and extending pass the outer portions 26a and 26b of the blade 18 is a side wall 38. A flap or flange can extend inwardly and towards the blade to provide for the side wall to include a lip (not illustrated in this figure). The top plate, side wall and lip will produce a blade guard that will adequately cover the outer ends of the blade. This coverage will offer protection for the user by preventing and blocking the debris which may propel from the blade when the device is activated. The additional space of the blade guard provides an adequate amount of clearance between the blade and itself, so as to prevent build-up, typically associated with conventional edgers. Back flaps, illustrated but not labeled are also provide to offer protection to the user. The back flaps are fabricated from a flexible, yet durable material.

For additional coverage, a supplemental cover 40 is provided. This supplemental cover 40 can be retrofitted onto an existing edger, or optionally, can be an integral structure. If this is an integral structure, then side wall 38 and lip can be eliminated.

The supplemental cover includes an extender 42. This extender 42, if used with an existing edger, includes a conventional attaching means 50 (illustrated in FIG. 3). The extender 42 is substantially triangular and includes an outer edge 44. Extending downwardly from the edge 44 is a protecting wall 46. The protecting wall extends the length of the outer portions 26a and 26b, respectively. This will provide protection for the user. A lip 48, extending inward and towards the blade can be located on the outer edge for providing even more protection.

Accordingly, it is seen that the present invention 10 can be a unit or optionally a kit which will enable the consumer to alter and change their existing edgers. To alter an existing edger, the user would first remove the existing back flaps. New flaps (illustrated in FIG. 1 and labeled as 52), longer in length would be attached to the rear of the edger. The existing cover would be tapped for providing threaded apertures to exists. The supplemental cover would include threaded apertures and would be adapted to align with the tapped holes in the existing cover. Bolts would extend therethrough to allow for the supplemental cover to be attached thereto. This embodiment for the attaching means is illustrated in FIG. 3. The blade 18 would be secured via the conventional means well known in the field. The attaching means 50 described above is merely an example of an attaching means which has been utilized to produce favorable results. Other attaching means can be utilize for producing favorable results. For example, for a more permanent attachment, the supplemental cover can be attach by adhesives, welding, or the like.

The effectiveness of formulation made in accordance with the teaching of the present invention, in particular to the blade and cover is illustrated by the following example and field test.

EXAMPLE

| Components of Head Portion (14) | Measurement |
| --- | --- |
| Length of upper portion | 4½ inches |
| Length of first end portion and second end portion | 2½ inches |
| Angular placement of first end portion with respect to the upper portion | 10 degrees |
| Angular placement of second end portion with respect to the upper portion | 10 degrees |
| Length of guard cover | 4 inches |

The rotary cutter blade described in the above example was secured on a conventional edger by the method as described above. The supplemental cover was attached to the existing cover by the method, as described above. The cutter blade was utilized one a daily basis between 30 minutes to one hour for a period of three months.

It was observed that the blade successfully performed a numerous amount of task. In one experiment, the blade was use to form a flower bed in a lawn which was not tampered with in 30 years, except for occasional mowing. In a matter of minutes the blade easily pulverized the ground into soft soil while disintegrating the grass. A flow bed was made in 15 minutes.

In yet another use, it was desired to run cable within the ground. Again the ground was a general yard, which was mowed on a regular basis. Once the location was determine, the blade successfully dug a trench which easily accepted the cable.

With repeated use, the blade did not wear. It appeared to be self-sharpening. This blade proved to be efficient, powerful, versatile, and economical.

While the invention has been particularly shown and described with reference to an embodiment thereof, it will be understood by those skilled in the art that various changes in form and detail may be made without departing from the spirit and scope of the invention.

I claim:

1. An edger blade to be used with a portable edger, said edger blade essentially comprising:
   an upper planar portion, being substantially rectangular in configuration, having a first end and a second end;
   an attaching means is centrally located in said top planar portion;
      said attaching means enables attachment to said portable edger, said portable edger being a hand held model and said top planar portion is vertical with respect to the ground;
   a first end portion extends outwardly from said first end and said first end portion is substantially rectangular in configuration;
   a second end portion extends outwardly from said second end and said second end portion is substantially rectangular in configuration;
      said first end and said second end will contact and engage said ground for providing said first end and said second end to be parallel to said ground;
   a gap having a clearance and free of obtrusions is located between said first end and said second end for providing said blade to be generally U-shape;
   said first end portion and said second end portion consisting essentially of rectangular shape members, each having an outer edge and an inner edge;
   said inner edge of said first end portion will contact and engage said ground and said outer edge of said second end portion will contact and engage said ground to provide for said blade to be self sharpening.

2. An edger blade as in claim 1 wherein said first end portion and said second end portion are perpendicularly attached to said upper planar portion.

3. An edger blade as in claim 1 wherein said first end portion and said second end portion are displaced angularly with respect to said upper planar portion, said first end portion extends towards said second end portion and said second end portion extends towards said first end portion.

4. An edger blade as in claim 1 wherein said first end portion and said second end portion are displaced angularly with respect to said upper planar portion, said first end portion extends away from said end portion and said second end portion extends away from said first end portion.

5. An edger blade as in claim 1 wherein a first flange extends outwardly from said first end of said top planar portion and beyond said first end portion, a second flange extends outwardly from said second end of said top planar portion and beyond said second end portion, said first flange and said second flange are planar and linear with respect to said top planar portion for providing said top planar portion, said first flange, and said second flange to form a continuous top surface.

6. An edger blade as in claim 1 wherein said top planar portion includes a length of approximately four to five inches, and said length of said first end portion and said second end portion being approximately two to 3 inches.

7. An edger blade as in claim 1 wherein a blade guard is secured to said attaching means for protecting a user, said blade guard comprises a top cover having substantially triangular shape with two outer edges and a curved front edge forming said triangular shape, extending downwardly from said curved front edge, and extending pass said first end portion and said second end portion is a side wall.

8. An edger blade as in claim 1 wherein a supplemental cover is secured to an existing cover of said portable edger for protecting a user when utilizing said portable edger, said supplemental cover includes an extender, said extender includes a securing means for securing said extender to said existing cover and when secured provides for said extender to extend beyond said existing cover, said extender is substantially triangular and includes an outer edge, a protecting wall extends downwardly from said edge and said protection wall extends beyond a protecting wall of said existing cover.

9. An edger blade as in claim 8 wherein said protecting wall includes a lip extending inward and towards said first outer portion and said second outer portion.

10. An edger blade as in claim 8 wherein said first end portion and said second end portion are perpendicularly attached to said upper planar portion.

11. An edger blade as in claim 8 wherein said first end portion and said second end portion are displaced angularly with respect to said upper planar portion, said first end portion extends towards said second end portion and said second end portion extends towards said first end portion.

12. An edger blade as in claim 8 wherein a first flange extends outwardly from said first end of said top planar portion and beyond said first end portion, a second flange extends outwardly from said second end of said top planar portion and beyond said second end portion, said first flange and said second flange are planar and linear with respect to said top planar portion for providing said top planar portion, said first flange, and said second flange to form a continuous top surface.

13. An edger blade as in claim 8 wherein said top planar portion includes a length of approximately four to five inches, and said length of said first end portion and said second end portion being approximately two to 3 inches.

14. An edger blade as in claim 8 wherein said first end portion and said second end portion are displaced angularly with respect to said upper planar portion, said first end portion extends away from said end portion and said second end portion extends away from said first end portion.

15. A set of edger blades to be used with a portable edger, said set of edger blades comprising:

at least two edger blades;

each edger blade includes an upper planar portion having a first end and a second end;

an attaching means is centrally located in each of said edger blade said top planar portion;

said attaching means enables attachment to said portable edger, said portable edger being a hand held model and each of said top planar portion is vertical with respect to the ground when secured to said portable edger;

each edger blade includes a first end portion that extends outwardly from said first end and said first end portion is substantially rectangular in configuration;

each edger blade includes a second end portion extends outwardly from said second end and said second end portion is substantially rectangular in configuration;

said first end and said second end of each edger blade will contact and engage said ground for providing said first end and said second end to be parallel to said ground when secured to said portable edger;

a gap having a clearance and free of obtrusions is located between said first end and said second end of each edger blade for providing said blade to be generally U-shape;

said first end portion and said second end portion consisting essentially of rectangular shape members, each having an outer edge and an inner edge;

said inner edge of said first end portion of each edger blade will contact and engage said ground and said outer edge of said second end portion of each edger blade will contact and engage said ground to provide for said blade to be self sharpening;

said first end portion and said second end portion of each edger blade are displaced angularly with respect to said upper planar portion, each angular displace being different per edger blade.

16. A set of edger blades as in claim 15 wherein one first end portion and one second end portion of one of said at least two edger blades are displaced perpendicularly with respect to said upper planar portion.

17. A set of edger blades as in claim 15 wherein one first end portion and one second end portion of one of said at least two edger blades are displaced angularly with respect to said upper planar portion to provide for said first end portion to extend towards said second end portion and said second end portion to extend towards said first end portion.

18. A set of edger blades as in claim 15 wherein one first end portion and one second end portion of one of said at least two edger blades are displaced angularly with respect to said upper planar portion, said first end portion extends away from said end portion and said second end portion extends away from said first end portion.

19. A set of edger blades as in claim 15 wherein at least one blade of said three edger blades includes a first flange which extends outwardly from said first end of said top planar portion and beyond said first end portion of said at least one blade, a second flange extends outwardly from said second end of said top planar portion and beyond said second end portion of said at least one blade, said first flange and said second flange are planar and linear with respect to said top planar portion for providing said top planar portion, said first flange, and said second flange to form a continuous top surface.

* * * * *